US009963371B2

(12) United States Patent
Suidan et al.

(10) Patent No.: US 9,963,371 B2
(45) Date of Patent: May 8, 2018

(54) THERMO-OXIDATION OF MUNICIPAL WASTEWATER TREATMENT PLANT SLUDGE FOR PRODUCTION OF CLASS A BIOSOLIDS

(71) Applicants: Pegasus Technical Services, Inc., Cincinnati, OH (US); The United States of America as Represented by the Administrator of the U.S. Environmental Protection Agency, Washington, DC (US)

(72) Inventors: Makram T. Suidan, Cincinnati, OH (US); Richard C. Brenner, Cincinnati, OH (US); Edith L. Holder, Cincinnati, OH (US); Robert J. Grosser, Cincinnati, OH (US)

(73) Assignee: U.S. Environmental Protection Agency, Washington, DC (US)

( * ) Notice: Subject to any disclaimer, the term of this patent is extended or adjusted under 35 U.S.C. 154(b) by 295 days.

(21) Appl. No.: 14/711,288

(22) Filed: May 13, 2015

(65) Prior Publication Data
US 2015/0329393 A1    Nov. 19, 2015

Related U.S. Application Data

(60) Provisional application No. 61/996,629, filed on May 13, 2014.

(51) Int. Cl.
*C02F 1/72*      (2006.01)
*C02F 11/06*    (2006.01)
(Continued)

(52) U.S. Cl.
CPC .............. *C02F 11/06* (2013.01); *C02F 3/12* (2013.01); *C02F 11/18* (2013.01); *C02F 1/722* (2013.01);
(Continued)

(58) Field of Classification Search
CPC .... C02F 1/722; C02F 3/12; C02F 3/05; C02F 3/121; C02F 3/1221; C02F 3/1236;
(Continued)

(56) References Cited

U.S. PATENT DOCUMENTS 4,377,486 A * 3/1983 Barrick ................... C02F 11/12
                                                                210/609
6,783,679 B1 * 8/2004 Rozich ................... C02F 3/006
                                                                210/614

OTHER PUBLICATIONS

Dhar et al., "Thermo-oxidative pretreatment of municipal waste activated sludge for volatile sulfur compounds removal and enhanced anaerobic digestion," Chemical Engineering Journal, 174 (2011) 166-174.*

* cited by examiner

*Primary Examiner* — Lucas Stelling
(74) *Attorney, Agent, or Firm* — Stein IP, LLC; Mark Sullivan (57) ABSTRACT

A process for treatment of municipal wastewater plant sludge to the criteria of Class A biosolids. The process uses hydrogen peroxide and thermo-oxidation to reduce volatile suspended solids to meet the criteria. On a batch basis, waste activated sludge is introduced into a reactor; the concentration of the waste activated sludge is adjusted to about 1.5% total suspended solids with secondary effluent, if necessary; the reactor is mixed; the reactor is pre-heated to an operating temperature in a range of about 65° C. to about 90° C.; subsequently, a 50% solution of laboratory grade hydrogen peroxide is introduced into the bottom of the reactor; and the contents are heated for at least 4 hours.

11 Claims, 6 Drawing Sheets

(51) Int. Cl.
  *C02F 11/18* (2006.01)
  *C02F 3/12* (2006.01)
(52) U.S. Cl.
  CPC ...... *C02F 2203/00* (2013.01); *C02F 2209/02* (2013.01); *C02F 2209/06* (2013.01)
(58) Field of Classification Search
  CPC ...... C02F 3/1263; C02F 3/1284; C02F 11/06; C02F 11/12; C02F 11/18; C02F 2209/02; C02F 2209/06; C02F 2203/00
  See application file for complete search history.

THERMO-OXIDATION OF MUNICIPAL WASTEWATER TREATMENT PLANT SLUDGE FOR PRODUCTION OF CLASS A BIOSOLIDS

CROSS-REFERENCE TO RELATED APPLICATIONS

This application is a non-provisional of U.S. Provisional Application No. 61/996,629, filed May 13, 2014 in the U.S. Patent and Trademark Office. All disclosures of the document named above are incorporated herein by reference.

BACKGROUND OF THE INVENTION

1. Field of the Invention

Aspects of the present invention relate to a heated chemical treatment of wastewater treatment plant (WWTP) excess aerobic sludge, including aerobically digested sludge, waste sludge from oxidation ditches and other long-sludge residence time (SRT) activated sludge wastewater treatment processes, and waste sludge from conventional SRT activated sludge processes.

2. Description of the Related Art

Municipal WWTP sludge is typically composed of a combination of raw primary sludge and excess or waste activated sludge that is digested, either anaerobically or aerobically, to achieve solids mass reduction, vector attraction reduction, and a reduction in microbial indicators of fecal contamination such as fecal coliforms. In most cases, the digested sludge is subjected to mechanical dewatering to produce a drier material that can be incinerated, disposed of in a sanitary landfill, or applied in bulk to agricultural land as biosolids. Some producers of biosolids further dry the processed material to the point where it can be bagged and sold as a commercial soil conditioner/fertilizer (e.g., Milorganite produced by the Milwaukee Metropolitan Sewerage District).

WWTP sludge is generally processed to levels where it can meet Federal Class B sludge regulations. The Class B regulations represent the minimum levels of pathogen reduction that are acceptable for land application of biosolids (i.e., treated WWTP sludge). These regulations specify that wastewater sludge must be treated by a process to significantly reduce pathogens (PSRP) that will achieve a vector attraction reduction (VAR) goal of 38% reduction in volatile suspended solids (VSS) or meet a fecal coliform level in the processed sludge ≤2,000,000 MPN (Most Probable Number)/g, or alternately ≤2,000,000 CFU (Colony Forming Units)/g, based on the geometric mean of seven samples. Some states require municipal WWTPs to meet both stipulations to achieve a Class B rating. PSRPs include, among others, anaerobic sludge digestion at a mean cell residence time (MCRT) of at least 15 days at a temperature of 35° C.-55° C. and aerobic sludge digestion at a MCRT of at least 40 days at 20° C.

Land application of Class B biosolids, although widely practiced in the United States, has been accompanied by numerous and ongoing public complaints over the years. These complaints range from emanation of malodors from the applied fields to claims of illnesses and even deaths caused by volatilization of harmful compounds contained in the biosolids or direct contact with the biosolids. These complaints can be circumvented and most likely dispelled by the land application of biosolids treated to a higher level, namely Class A biosolids. The definition of Class A biosolids mandates the reduction of fecal coliforms and/or *Salmonella* to non-detect levels.

Prior research was conducted on anaerobically digested sludge produced on site in short-term 5-day MCRT bench-scale digesters at the University of Cincinnati (UC) (Cacho Rivero, 2005). Feed to the anaerobic digesters consisted of a mixture of primary and waste activated sludges from municipal WWTPs. The effluent sludge from these digesters was treated in a thermo-oxidation process in separate heated reactors. Hydrogen peroxide ($H_2O_2$) was added at doses ranging from 0.1-0.5 g/g volatile suspended solids (VSS) (dry wt.) and temperatures ranging from 35° C.-90° C. The higher doses and temperatures produced the greatest reduction in VSS. For example, at 90° C., VSS reductions of 58%, 65%, and 73% were achieved at $H_2O_2$ doses of 0.1, 0.25, and 0.5 g/g VSS, respectively. All of these VSS reduction levels are substantially greater than the minimum 38% reduction required for Class B sludge. The $H_2O_2$ dose was bled into the reactor over 6 hours to minimize foaming. The pH of the thermo-oxidation sludge remained largely unchanged, tending to increase slightly. At 90° C., no fecal coliforms were detected in the $H_2O_2$-treated sludge, thereby meeting the criteria for Class A biosolids.

Historically, WWTP design has utilized a two-stage treatment system configuration with a first-stage primary settling process followed by a second-stage biological treatment process. In the past, most WWTPs have utilized conventional activated sludge designs with SRTs in the range of 3-8 days as the second stage. Recently, particularly for WWTPs with low to moderate hydraulic capacity (i.e., 1-20 million gallons per day [mgd]), design engineers have determined it is more cost effective to eliminate first-stage primary settling of influent wastewater. Rather, influent wastewater is fed directly to a longer-SRT (>15 days) extended aeration activated sludge reactor, thereby obviating the need and cost of handling combined primary and waste activated sludges. Eliminating primary clarification in the treatment train and further because activated sludge reactors produce only aerobic sludge, there is less incentive to incorporate anaerobic digestion in the sludge treatment flowsheet.

Based on the above evolution in WWTP design philosophy, emphasis has shifted to the development of cost-effective methods for treating excess sludge from aerobic systems. It was postulated that the above thermo-oxidation concept would also perform well on excess activated sludge to produce Class A biosolids.

The theory behind the mating of first-stage biological treatment with follow-on second stage thermo-oxidation (chemical) treatment is to use the microorganisms in the biological treatment stage to cost-effectively oxidize most of the easy-to-degrade organics contained in the sludge matrix and to use the more expensive chemical ($H_2O_2$) treatment to oxidize the more recalcitrant organic compounds that are not easily degraded biologically. This treatment sequence optimizes what the biological and chemical stages do best and most efficiently. Highly oxidized excess sludge from WWTPs, whether produced in an aerobic digester or as mixed liquor sludge in an extended aeration activated sludge plant, and possibly even mixed liquor in a less oxidized conventional activated sludge process, are suitable for direct feed into the thermo-oxidation reactor. The thermo-oxidation process should be able to accommodate most sludges typically produced by municipal WWTPs.

Another benefit of the thermo-oxidation process is that some fraction of the nitrogen (particularly ammonia) inventory in the $H_2O_2$ feed sludge is solubilized during treatment in the thermo-oxidation reactor and can be recycled to the head of the treatment plant works in the reactor supernatant. If this did not happen, the entire nitrogen load would be transported to the application field in the biosolids. A significant fraction of this load, particularly the easily released ammonia component, would be rapidly solubilized and discharged into the soil, potentially exceeding the sorption capacity of the soil and contaminating ground water resources. By removing the easily released nutrient components in the WWTP sludge, the nutrients more tightly bound to the biosolids will be released slowly as needed for soil conditioning and fertilization.

SUMMARY OF THE INVENTION

Aspects of the claimed invention overcome deficiencies in the prior art.

Other aspects of the claimed invention provide a thermo-oxidation process to cost effectively produce Class A biosolids from WWTP excess sludges.

Further aspects of the claimed invention provide a process that can effectively treat either excess sludge from an aerobic digester or thickened mixed liquor from an extended aeration (long-SRT) reactor.

The thermo-oxidation process described herein uses $H_2O_2$ addition at elevated temperatures to achieve increased levels of VSS destruction and VAR and disinfection of excess sludge that has been generated in an aerobic wastewater treatment process.

The thermo-oxidation process is operated by batch feeding waste activated sludge into a constantly stirred tank reactor (CSTR). The reactor is pre-heated to the target temperature between 65° C. and 90° C. Technical grade $H_2O_2$ is slowly introduced at or near the bottom of the reactor at a concentration between 0.1 to 0.2 g/g VSS over the first 30 minutes of operation to prevent foaming. When operating at 90° C., a reactor residence time of 2 to 4 hours is necessary to achieve maximum VSS destruction. A reactor residence time 1 hour achieved non-detect levels of fecal coliforms without regrowth potential. Substantially improved settling characteristics are achieved with $H_2O_2$ treated sludge as measured by 30 minutes of settling in a 1,000 mL graduated cylinder compared with sludge either untreated or treated with temperature alone. Nitrogen in the form of ammonia is released to the liquid phase where it can be recycled back to the head of the WWTP to avoid rapid release in the soil and potential contamination of ground water.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

To achieve reduction of VSS on a batch basis, waste activated sludge (WAS) is introduced into a reactor; the concentration of the WAS is adjusted to about 1.5% total suspended solids (TSS) with secondary effluent, if necessary; the reactor is mixed; the reactor is pre-heated to an operating temperature in a range of about 65° C. to about 90° C.; subsequently, a 50% solution of laboratory grade $H_2O_2$ is introduced into the bottom of the reactor; and the contents are heated for at least 4 hours.

The $H_2O_2$ is introduced to the reactor upon reaching the operating temperature at a concentration range of about 0.05 to 0.2 g/g VSS over about 30 minutes to reduce foaming. Evaporation is controlled by directing pressurized air through an air humidifier into the head space of the reactor at a flow rate of about 200 mL/minute and/or by installing a condenser on the reactor to condense and recycle water vapor in the head space.

Figure 1:
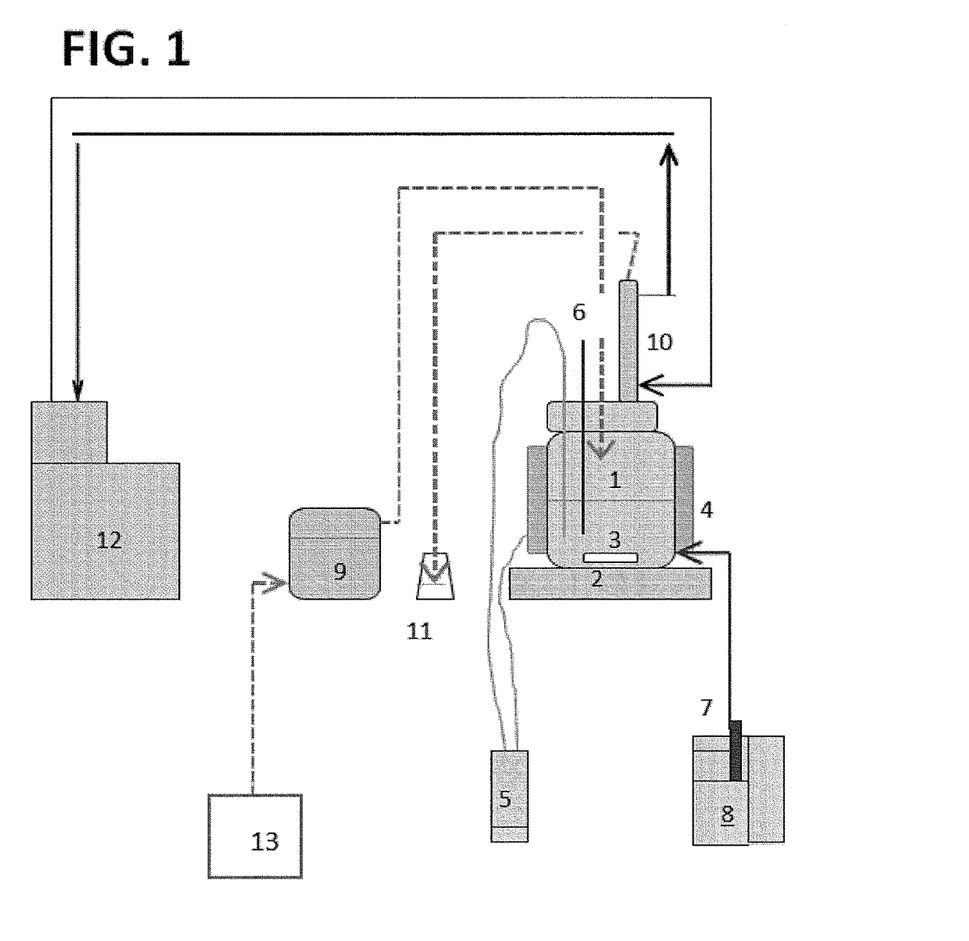
FIG. 1 illustrates the configuration for one bench-scale test reactor according to an aspect of the claimed invention.
Figure 2A:
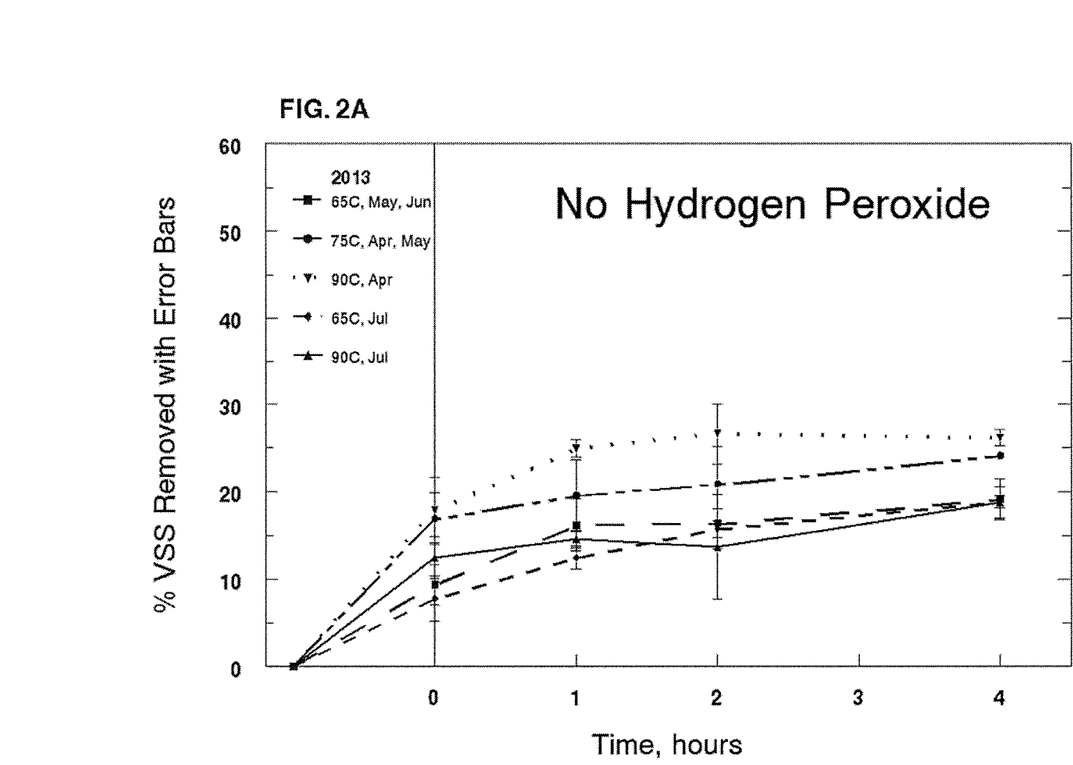
FIG. 2A shows the performance (% VSS removal) of the bench-scale reactor on Mason, OH WWTP waste activated sludge (WAS) at various temperatures and no $H_2O_2$ according to another aspect of the claimed invention.
Figure 2B:
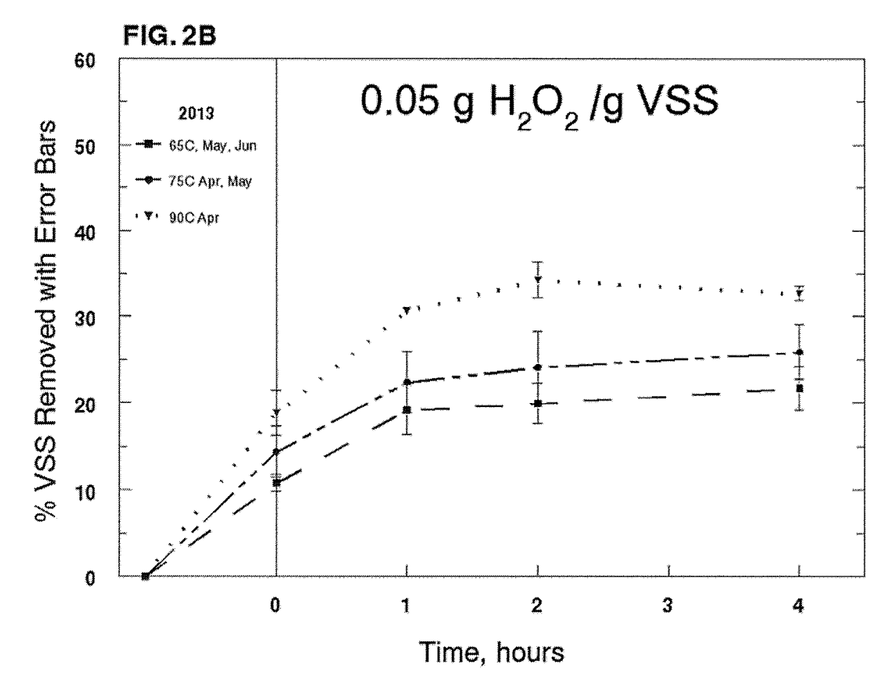
FIG. 2B shows the performance (% VSS removal) of the bench-scale reactor on Mason, OH WWTP waste activated sludge (WAS) at various temperatures and 0.05 g $H_2O_2$/g of VSS according to another aspect of the claimed invention.
Figure 2C:
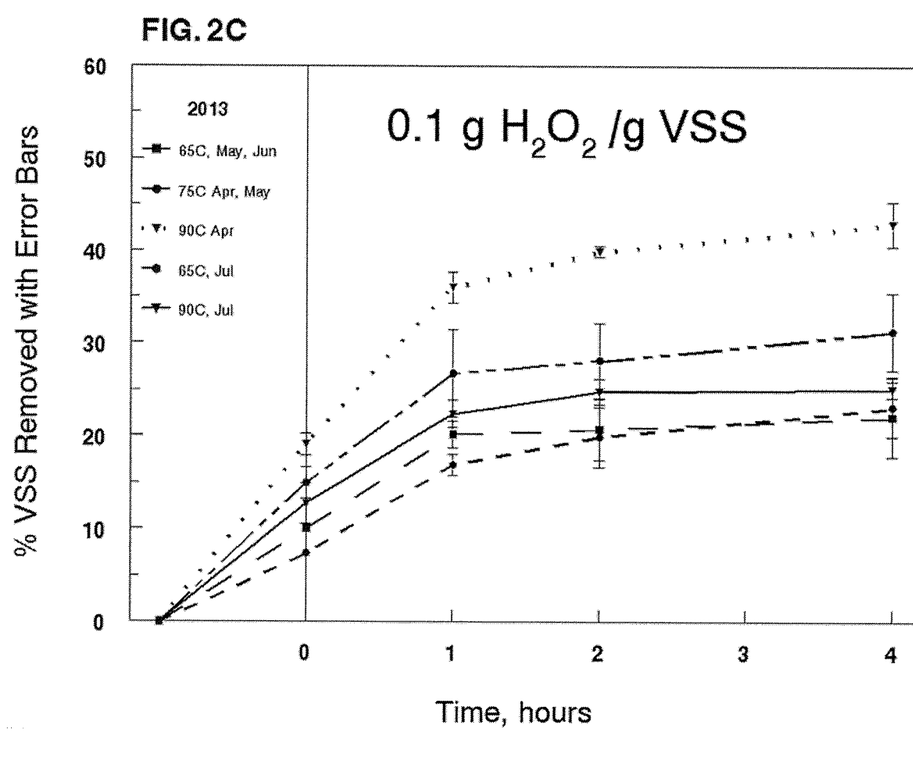
FIG. 2C shows the performance (% VSS removal) of the bench-scale reactor on Mason, OH WWTP waste activated sludge (WAS) at various temperatures and 0.1 g $H_2O_2$/g of VSS according to another aspect of the claimed invention.
Figure 2D:
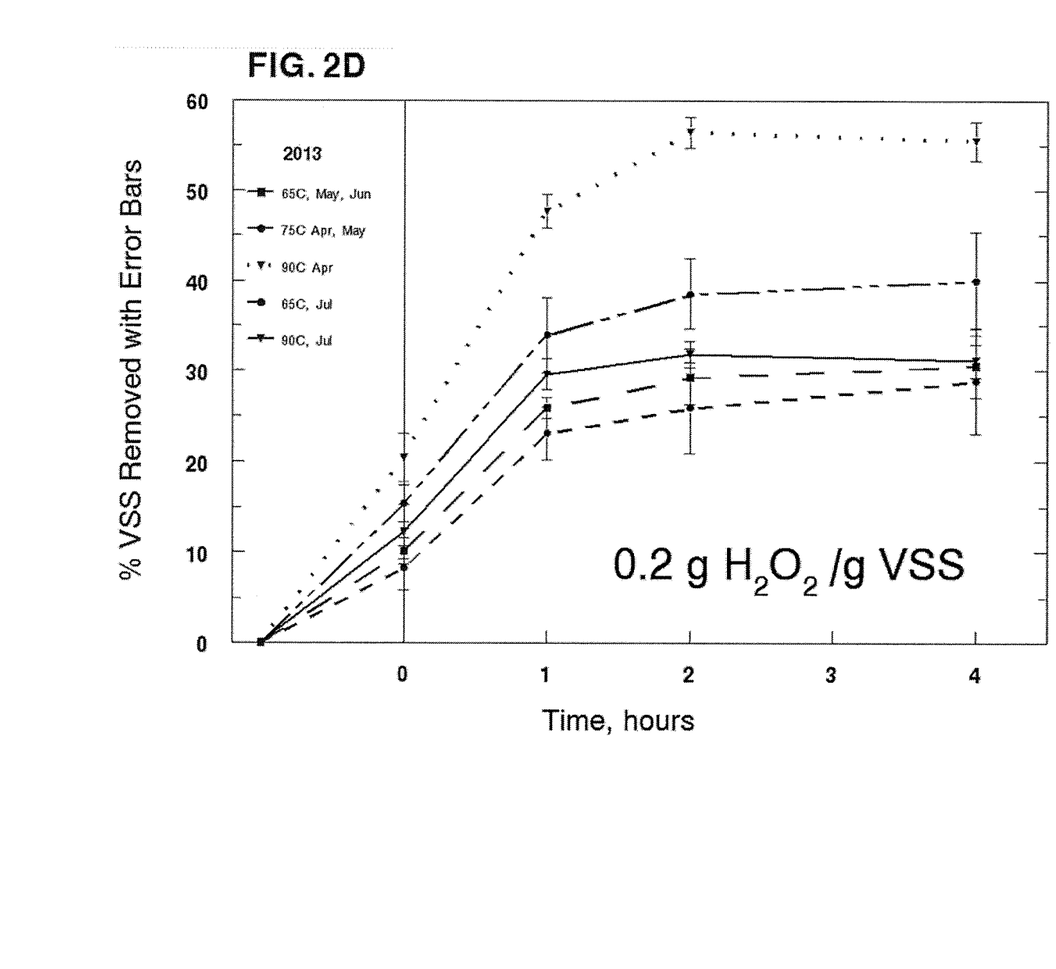
FIG. 2D shows the performance (% VSS removal) of the bench-scale reactor on Mason, OH WWTP waste activated sludge (WAS) at various temperatures and 0.2 g $H_2O_2$/g of VSS according to another aspect of the claimed invention.

Experiments were conducted in a laboratory (see below), and four waste treatment plant test reactors were operated in parallel during data collection runs. Different operating conditions were imposed on each reactor during each run. The following operational description applies to one of the test reactors. The configuration described is illustrated in FIG. 1.

The test reactor 1 was a 4-L glass flask. A rubber stopper (not numbered) was inserted into the neck of the flask resulting in a sealed reactor. Two L of WAS at a concentration of approximately 1.5% TSS were batch fed into the test reactor 1. To obtain a concentration of roughly 1.5% TSS, the thickened WAS feed was diluted with secondary effluent from the same WWTP. The test reactor was set on a stirring plate 2, and a 4-in. stir bar 3 was placed into the flask. The stirring plate 2 was turned on to bring the stir bar into motion. The stirring plate 2 was maintained at a setting that would keep the stir bar 3 in uniform circular motion on the bottom of the reactor 1 to promote mixing of the WAS contents.

A temperature controller 5 (in this embodiment a rheostat wired to a thermocouple) was used to control liquid temperature within the test reactor. The thermocouple was inserted through the rubber stopper into the test reactor 1 contents. The test reactor 1 was wrapped with heat tape overlain with glass wool insulation 4 (hereinafter heat tape and/or glass wool insulation 4). The heat tape 4 was also wired to the temperature controller 5. The temperature controller 5 rheostat was set at the desired test reactor 1 operating temperature. The desired test reactor 1 operating temperature was maintained via a signal from the thermocouple to the temperature controller 5 rheostat to control the current to the heat tape 4. To verify the accuracy of the system, temperature readings inside the test reactor 1 were also checked periodically with a thermometer 6, also inserted through the rubber stopper.

Pressurized laboratory air 13 was directed through an air humidifier 9 and then through an opening in the rubber stopper and into the head space of the test reactor 1 (the head space is dotted line above the test reactor 1. The purpose of the humidified air injection was to prevent water loss from the test reactor 1 during its operation. The flow rate of the pressurized laboratory air 13 was maintained at ~200 mL/minute via an inlet valve installed in the feed line.

Another control to prevent loss of water from the reactor was the use of a condenser 10 that received cold water from a refrigerated bath 12. Water vapor in the headspace condensed and flowed back into the test reactor 1. In this way, evaporation was minimized during a test run. Exit gas flowed from the condenser into an Erlenmeyer flask 11 containing water to monitor gas flow and prevent backflow.

For those reactors receiving $H_2O_2$ treatment, a 50% solution of laboratory grade $H_2O_2$ was injected into the bottom of the test reactor 1 using a syringe pump 8. The syringe pump 8 was fitted with a 10-mL syringe 7 containing the $H_2O_2$ dose. The selected $H_2O_2$ feed dose was pumped into the test reactor 1 over a 30-minute period (to minimize foaming) beginning immediately after the test reactor 1 WAS inventory reached its targeted operating temperature for that run. Calculation of the $H_2O_2$ dose was made from VSS measurement of the feed WAS.

The temperature controller 5 was activated immediately following loading of the test reactor 1 with WAS. Depending on the target operating temperature (65° C.-90° C.), the test reactor 1 typically reached that temperature within 30-60 minutes. At this time, injection of the selected $H_2O_2$ dose was initiated using the syringe pump 8. WAS samples were usually collected at t=initial (when the temperature controller 5 was turned on), t=0 (when the test reactor 1 temperature reached its target level), t=1 hour, t=2 hours, t=4 hours, t=8 hours, and t=24 hours. Analyses and measurements conducted on these samples consisted of TSS, VSS, chemical oxygen demand (COD), total Kjeldahl nitrogen (TKN), ammonia nitrogen ($NH_4$—N), total phosphorus (TP), and fecal coliforms. pH and test reactor 1 temperature were monitored routinely throughout each run. Solids settling rates were measured after 24 hours of operation when the test reactor 1 was emptied by recording compacted sludge volume (or sludge blanket level) in a 1,000-mL graduated cylinder after 30 minutes and 24 hours of settling.

Key parameters in defining process performance with this technology are fecal coliform destruction and VSS reduction. Fecal coliforms are a universally recognized indicator microorganism for the presence or absence of pathogenic microorganisms. It is the key microbiological parameter for determining if a treated biosolids product meets Class A standards. If fecal coliforms are absent, the assumption is that pathogens also are not present. VSS reduction is an indirect measure of the amount of particulate organic matter oxidized during sludge treatment. VSS reduction is the sole mechanism with this process by which sludge mass is decreased for minimizing sludge handling cost. It is also critical in achieving VAR and a stable sludge mass that can be applied to land or stored awaiting land application without the threat of objectionable odor generation.

FIGS. 2A-2D are plots of VSS removal vs. reactor residence time for triplicate runs conducted on Mason, OH WWTP WAS. Four conditions are plotted showing no $H_2O_2$ addition (a temperature only control) and $H_2O_2$ doses of 0.05, 0.1, and 0.2 g/g VSS. Three operating temperatures (65° C., 75° C., and 90° C.) were evaluated for each $H_2O_2$ dose. All operating temperatures for a given $H_2O_2$ dose are shown on each graph. Values for t=initial, t=0, and t =1, 2, 4, 8, and 24 hours are given. As would be expected, three trends are indicated. VSS removal (i.e., organic matter destruction) increases with increasing reactor residence time, increasing operating temperature, and increasing $H_2O_2$ dose. For the 75° C. and 90° C. temperatures, 86%-92% of the total 24-hour VSS reduction was achieved in the first 4 hours for the 0.1 and 0.2 $H_2O_2$ doses. At these two temperatures for the 0.05 $H_2O_2$ dose, VSS removal dropped to 80%-84% of the ultimate 24-hour removal in the first 4 hours. In other words, the major fraction of VSS removal was obtained for these two operating temperatures at the two highest $H_2O_2$ doses in the first 4 hours of operation; somewhat less removal was achieved at the lowest $H_2O_2$ dose. For the 65° C. operating temperature, VSS removals achieved in the first 4 hours dropped to 75%-85% of their respective 24-hour removals at the various $H_2O_2$ doses.

For the 90° C. operating temperature, VSS removal roughly doubled with the 0.2 $H_2O_2$ dose for the 4-hour (26% to 55%) and 24-hour (33% to 62%) residence times compared to the undosed controls during cold weather. During warmer weather, VSS destruction increased 65% (19% to 31%) at this dose for the 4-hour residence time (no data were generated for a 24-hour residence time). Less VSS reduction, as expected, is achieved during warmer weather as wastewater temperature increases. More of the influent wastewater organics in warmer weather are oxidized in the secondary treatment activated sludge aeration tank before reaching the excess sludge handling process. At 90° C., the incremental differences in VSS removal at the two residence times with the addition of $H_2O_2$ at 0.1 g/g VSS vs. no addition tended to approximate half of the incremental differences noted at 0.2 g/g VSS. At an $H_2O_2$ dose of 0.05 g/g VSS and 90° C., the incremental differences dropped to about one-fourth of those achieved with the highest dose.

Figure 3:
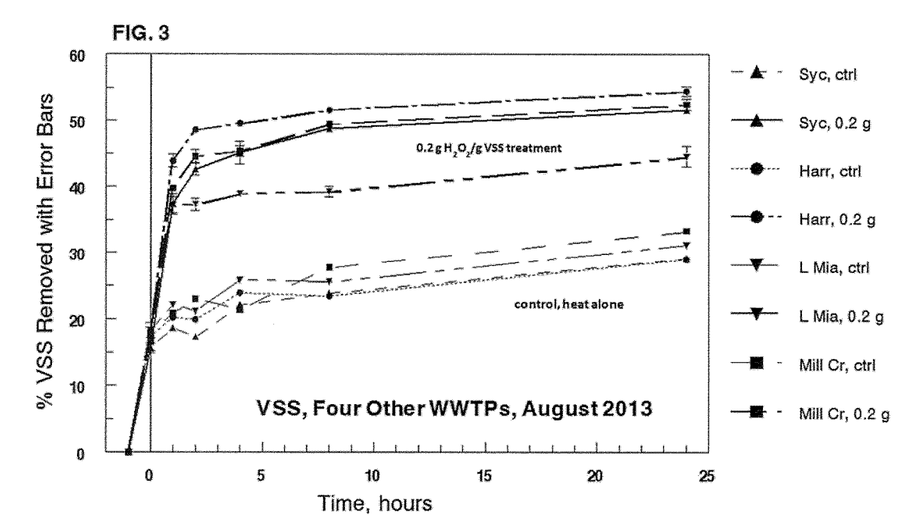
FIG. 3 shows summertime performance (% VSS removal) for four other municipal WWTPs in the Greater Cincinnati (OH) area.

In FIG. 3, % VSS vs. reactor residence times plots are shown for four WWTPs, other than the Mason plant, in the Greater Cincinnati area. All test runs were conducted during warm weather on WAS at an $H_2O_2$ dose of 0.2 g/g VSS (along with undosed controls) and an operating temperature of 90° C. The results for three (Sycamore, Harrison, and Mill Creek) of the four WWTPs were quite close. The data curve for the fourth WWTP (Little Miami) while somewhat lower than the curves for the other three plants had the same approximate shape. These data confirmed the findings from the Mason test runs, namely that the large majority of VSS removal is achieved in the first 4 hours of operation and incremental VSS reduction with the 0.2 $H_2O_2$ dose at 90° C. can approximate up to twice the incremental VSS reduction noted with no $H_2O$ addition.

Fecal coliform values decreased to non-detectable levels after 1 hour (or less) of reactor residence time at all three temperatures tested and with all three applied $H_2O_2$ doses. No regrowth was noted after 1 week at room temperature with any of these samples. Reduction of fecal coliforms to non-detectable levels occurred with heat alone for the 75° C. and 90° C. conditions, but not at 65° C. In some instances, subsequent regrowth at room temperature was observed.

This thermo-oxidation process also greatly enhances sludge settleability. In numerous post treatment sludge settling tests, WAS that was treated with heat only would settle to a blanket level of ~700-980 mL in a 1,000-mL graduated cylinder after 24 hours. In contrast, WAS that was both heated and dosed with $H_2O_2$ would settle to a blanket level of ~150-400 mL in a 1,000-mL graduated cylinder after 24 hours.

The above data form the basis for the recommended operating conditions for this invention. VSS reductions achieved at an operating temperature of 65° C. are too low to be cost effective. Operation at this temperature is not recommended. Significant VSS reductions were observed at both 75° C. and 90° C., although, based on the data, the incremental reduction over that of the control reactor achieved at 90° C. can be as much as twice that accomplished at 75° C. For optimum performance, operation at 90° C. is recommended. As acceptably high levels (≥90%) of VSS reduction are achieved within the first 4 hours of operation vs. that achieved at 24 hours, operation at a reactor residence time of 4 hours is also recommended. This reactor residence time is eight times longer than the minimum 30 minutes sludge must be held at 90° C. to meet Class A biosolids regulations. Finally, the invention user has a choice of two acceptable $H_2O_2$ doses, 0.1 and 0.2 g/g VSS. With the higher dose, incremental VSS reduction vs. that of an undosed control will be up to two times higher than that of the lower dose. The final selection should be based on a cost analysis and the goals and requirements of the user.

All components of this bench-scale reactor can be readily adapted to a full-scale system. Most equipment can be purchased off-the-shelf. Only the heat exchange system may have to be custom designed. Standard corrosion-resistant tankage can be used for the system reactor.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A process for treatment of municipal wastewater plant sludge comprising:

introducing waste activated sludge and/or thickened mixed liquor sludge into a reactor;

adjusting the concentration of the waste activated sludge and/or thickened mixed liquor sludge to about 1.5% total suspended solids with secondary effluent;

mixing the contents in the reactor;

heating the reactor to an operating temperature in a range of about 75° C. to about 90° C.;

subsequently introducing a 50% solution of hydrogen peroxide into the bottom of the reactor; and heating the contents for at least 4 hours to maintain the operating temperature within the range.

2. The process of claim 1, wherein the hydrogen peroxide is introduced to a concentration range of about 0.05 to 0.2 g/g volatile suspended solids.

3. The process of claim 1, wherein the hydrogen peroxide is introduced over about the first 30 minutes after reaching reactor operating temperature.

4. The process of claim 1, wherein the hydrogen peroxide is technical grade.

5. The process of claim 1, wherein the reactor is heated to an operating temperature of about 90° C.

6. The process of claim 2 wherein the hydrogen peroxide is introduced to a concentration range of about 0.1 to 0.2 g/g volatile suspended solids.

7. The process of claim 1, further comprising the step of producing biosolids from the waste activated sludge and/or thickened mixed liquor sludge.

8. The process of claim 7, wherein the biosolids produced by the process meet Class A sludge biosolids regulations.

9. The process of claim 7, wherein fecal coliform levels in the biosolids are non-detectable and do not regrow in 7 days.

10. The process of claim 7, wherein the biosolids settle to a blanket level of about 150 mL to about 400 mL after 24 hours in a 1,000 mL graduated cylinder.

11. The process of claim 7, wherein a portion of the ammonia nitrogen inventory in the waste activated sludge or thickened mixed liquor sludge is released from the biosolids during treatment to the liquid phase for recycle to the headworks of a wastewater treatment plant.

* * * * *